(No Model.)

W. HUGHES.
COLLAR FASTENER.

No. 552,182.                     Patented Dec. 31, 1895.

Witnesses:
Frank Ingalls
George Buzzard

Inventor.
Wesley Hughes

UNITED STATES PATENT OFFICE.

WESLEY HUGHES, OF SENECA, KANSAS.

COLLAR-FASTENER.

SPECIFICATION forming part of Letters Patent No. 552,182, dated December 31, 1895.

Application filed April 12, 1895. Serial No. 545,554. (No model.)

*To all whom it may concern:*

Be it known that I, WESLEY HUGHES, a citizen of the United States, residing at Seneca, in the county of Nemaha and State of Kansas, have invented a new and useful Improvement in Couplers for Horse-Collars, of which the following is a specification, reference being had to the accompanying drawings, in which—

Figure 1 represents a plan of my coupler detached. Fig. 2 shows a perspective view of one part thereof, and Fig. 3 is a plan of a washer.

This improvement is designed to provide a coupling for horse-collars that will be easily made, cheaply constructed and convenient in use.

To these ends the invention consists in the device hereinafter more particularly described and then definitely claimed at the end hereof.

Referring now to the details of the drawings by letter, A is a curved plate having one or more rows of holes B for fastening to collar with bolts or rivets. Said plate A has its edges flanged upwardly and outwardly at C, forming rounded edges to rest on the horse's neck, also so rounded to fit the top end of one side of collar. At forward end D of plate A there are two lugs E on top side of plate A, set on said plate A diagonally for the purpose of holding a spring H, hereinafter described, to place also. As they are set diagonally on plate A, they form a wedge-shaped track to open or close said spring H when A is raised upward and over said lugs E, which have holes I through them on level with surface of plate A, and flanges C have holes F through them corresponding with holes I through lugs E, in which holes said spring H is held. Said spring H is a U-shaped spring with a downward bend O, then an outward bend K on each end of spring H, which parts pass through holes I in lugs E and holes F in flanges C and through flanges on the other half of the coupler when coupled, as I will explain farther on. When spring H lies down on plate A, spring ends *h* show outside of flanges C; but when spring H is raised to uncouple parts, the lugs E force spring H together somewhat at bends O and K, thus shortening distance from point *h* to point *h* of spring H, thereby releasing the other plate or half of the coupler. The other half of the coupling is a curved plate *a* with one or more holes *s* for riveting or bolting to collar with washer W (see Fig. 3) curved to fit the rounded points of collar on said bolt or rivet. Curved plate *a* is flanged on edges *b* similar to plate A of Fig. 1; but plate *a* is enough wider between flanges *b* to allow the other part of the coupler to pass forward and back inside of same. In order to lengthen or shorten collar at top for different-sized horses, flanges *b* have holes *c* near their bases, with tapered grooves *d* leading from said holes *c* to upper edges of flanges *b* for the purpose of guiding spring H ends *h* into holes *c*, and by pressing the two parts, Figs. 1 and 2, together, with the spring ends *h* placed in tapered grooves *d* of plate *a*, said spring ends *h* snap or spring into holes *c* of plate *a* and the two parts are connected.

What I claim as new is—

1. A coupler for a horse collar comprising two curved plates, adapted to be rigidly attached to the opposite ends of the collar and having upturned side flanges, the side flanges of one fitting between the side flanges of the other, and an expansible spring whose ends pass through holes in the side flanges of one plate and into holes in the flanges of the other plate, the flanges of the latter being provided with multiplex sets of holes to receive the ends of the spring, whereby the size of the collar may be adjusted as desired, substantially as described.

2. A coupler for horse collars comprising two plates, one having lugs with sides set diagonally, a swinging bail spring catch normally pressing against the diagonal sides of the lugs and working through holes in said lugs and passing into holes in the other plate, substantially as described.

3. The coupler for horse collars herein described, comprising two curved plates A *a*, plate A having perforated lugs E set diagonally, a swinging bail spring fastener H whose ends *h* work through said lugs, and through holes in the upturned flanges of the plates A *a*, said plate *a* having tapered grooves *d* leading to the holes C, all substantially as described.

In witness whereof I have hereunto signed my name, in the presence of two subscribing witnesses, on this 7th day of March, 1895.

WESLEY HUGHES.

Witnesses:
GEORGE BISERD,
F. T. INGALLS.